United States Patent [19]
Pompei

[11] Patent Number: 6,048,093
[45] Date of Patent: Apr. 11, 2000

[54] DIFFERENTIAL RADIATION DETECTOR PROBE

[75] Inventor: Francesco Pompei, Boston, Mass.

[73] Assignee: Exergren Corporation, Watertown, Mass.

[21] Appl. No.: 09/192,716

[22] Filed: Nov. 16, 1998

Related U.S. Application Data

[62] Division of application No. 08/665,593, Jun. 18, 1996, Pat. No. 5,836,692, which is a continuation of application No. 08/219,985, Mar. 30, 1994, abandoned.

[51] Int. Cl.$^7$ ................................................. G01J 5/12
[52] U.S. Cl. ......................................... 374/133; 250/349
[58] Field of Search .................................. 374/121, 133, 374/183, 170; 250/349

[56] References Cited

U.S. PATENT DOCUMENTS

| | | | |
|---|---|---|---|
| 2,986,935 | 6/1961 | Wpido et al. | 374/133 |
| 3,690,175 | 9/1972 | Butts | 374/134 |
| 3,848,466 | 11/1974 | Dial et al. | 374/163 |
| 4,133,700 | 1/1979 | Hollander et al. | 374/181 |
| 4,301,682 | 11/1981 | Everest | 374/121 |
| 4,348,898 | 9/1982 | Stan | 374/124 |
| 4,378,701 | 4/1983 | Mountain et al. | 374/121 |
| 4,718,777 | 1/1988 | Mydynski et al. | 374/181 |
| 4,759,895 | 7/1988 | Fortune et al. | 374/208 |
| 5,145,257 | 9/1992 | Bryant et al. | 374/133 |
| 5,169,235 | 12/1992 | Tominaga et al. | 374/121 |
| 5,229,612 | 7/1993 | Pompei et al. | 250/349 |
| 5,325,863 | 7/1994 | Pompei | 374/121 |

FOREIGN PATENT DOCUMENTS

| | | | |
|---|---|---|---|
| 1085366 | 2/1955 | France | 374/181 |
| 0172671 | 12/1921 | United Kingdom | 374/181 |
| 0835564 | 5/1960 | United Kingdom | 374/181 |

OTHER PUBLICATIONS

T Thermometry Infrared, p. 922, "New Noncontact Infrared Thermometer" and "Infrared Thermometers" and "BTU Meter," Cole–Parmer Instrument Company, Chicago, Illinois.

"The Temperature Handbook," OMEGA Engineering, Inc., pp. C–27 to C–30, C1–33, C1–34, 1989.

"Principles of Infrared Thermocouples," The Infrared Temperature Handbook by OMEGA Engineering, Inc., Stamford, CT, p. 37, 1994.

*Primary Examiner*—G. Bradley Bennett
*Assistant Examiner*—Gail Verbitsky
*Attorney, Agent, or Firm*—Hamilton, Brook, Smith & Reynolds, P.C.

[57] ABSTRACT

An infrared detector is positioned in a probe having leads which connect to a standard hand-held voltmeter. The detected voltage may indicate the difference between a target temperature surface and ambient temperature. For more accurate sensing of ambient temperature, a thermocouple may be connected in series with the thermopile with one junction at the thermopile cold junction temperature and another junction sensing ambient temperature. The ambient temperature may be that temperature surrounding the infrared detector or the temperature of the environment surrounding the meter. The infrared detector may be calibrated to provide a direct reading of temperature degrees by a factor of ten on the voltage scale of the meter. To that end, multiple thermocouples may be connected in series, each with a junction responding to ambient temperature and a junction responding to thermopile cold junction temperature.

14 Claims, 3 Drawing Sheets

DIFFERENTIAL RADIATION DETECTOR PROBE

RELATED APPLICATIONS

This application is a division of Ser. No. 08/665,593 filed Jun. 18, 1996, now U.S. Pat. No. 5,836,692, which is a File Wrapper Continuation of Ser. No. 08/219,985 filed Mar. 30, 1994 (now Abandoned), the entire teachings of which are incorporated herein by reference.

BACKGROUND OF THE INVENTION

Infrared radiation detectors have gained wide acceptance as non-contact temperature detectors. Such detectors have been used in such widespread applications as detecting heat loss from insulated structures, detecting electrical faults which result in increased temperature, and detecting ear temperatures of patients.

A preferred radiation detector is a thermopile. A thermopile generates a voltage which is indicative of the difference between hot and cold junction temperatures, the hot junction temperature being dependent on the heat flux from a target surface viewed by the hot junction. The heat flux is proportional to the difference in temperatures of the target and thermopile raised to the fourth power.

SUMMARY OF THE INVENTION

The present invention is directed to an electrical and thermal circuit which provides a differential output indicative of a differential between a target temperature and an ambient temperature. It is further directed to a novel combination of an infrared detector probe with a conventional electrical meter.

In accordance with one aspect of the present invention, an infrared detector is provided for viewing a surface at a target temperature. A thermocouple is coupled electrically with the infrared detector to provide a combined differential output. The thermocouple has one junction positioned to respond to ambient temperature and one junction positioned to respond to a junction temperature of the infrared detector. The thermocouple therefore provides an output indicative of the difference between the cold junction temperature and ambient temperature while the radiation detector, preferably a thermopile, provides an indication of the difference between the target temperature and the cold junction temperature. With properly selected temperature coefficients, the two devices connected in series provide a difference between the target temperature and the ambient temperature. Depending on the application, the thermocouple may be positioned to sense an ambient temperature surrounding the probe housing in which the radiation detector is positioned or it may be positioned at a more remote location such as at a meter to which the probe is connected.

In accordance with another aspect of the invention, the infrared detector is positioned in a probe housing having nonthermocouple leads coupled thereto. Connectors are provided at the opposite end of the leads for connection to socket connectors of a conventional hand-held electrical meter. The infrared detector may be calibrated to provide a direct reading of temperature degrees, by a factor of ten, on a voltage scale of the meter. Preferably, a handle portion of the probe is shaped like that of a conventional electrical probe so that the probe may be clipped onto the meter housing. The two may then be used as an integral assembly.

To match the detector output to a meter scale, plural thermocouples may be coupled in series, each with a junction at ambient temperature and a junction at a thermopile cold junction temperature.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
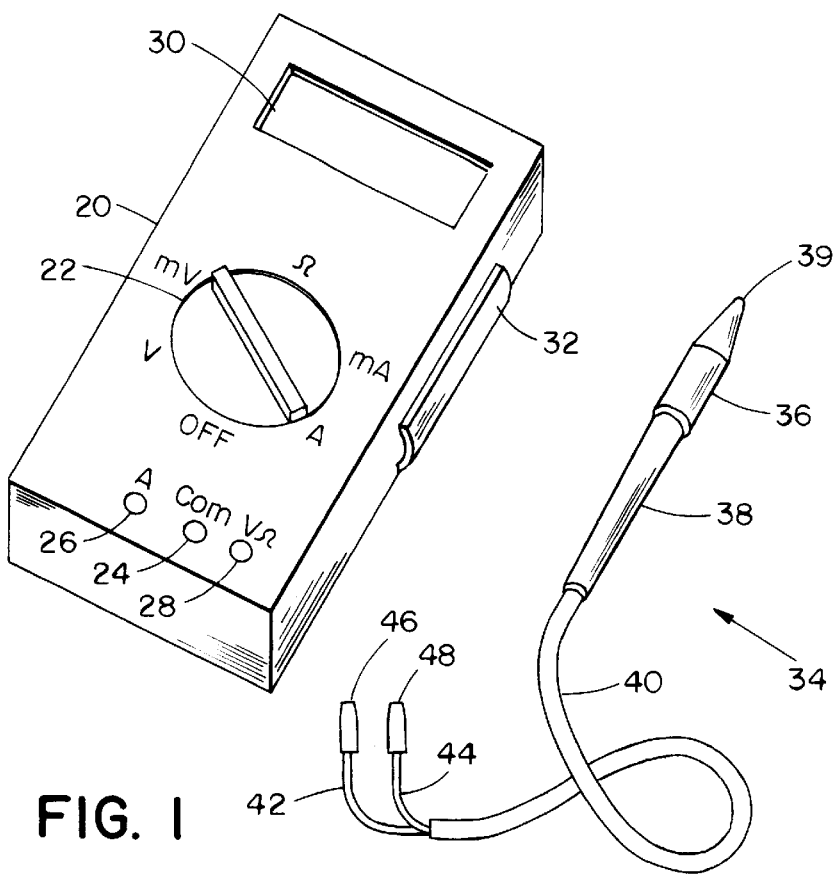
FIG. 1 illustrates a conventional electrical multimeter with a temperature detecting probe embodying the present invention.

FIG. 1 illustrates a conventional digital multimeter with an infrared detecting probe embodying the present invention. The meter may be of any conventional type such as one manufactured by Fluke. As such, and as illustrated in FIG. 1, the meter has electrical parameter scales and inputs but no temperature scale or temperature specific input. The one shown includes a housing 20 with a dial 22 for selecting one of several functions. For example, as illustrated the meter may be selected to provide a readout on a digital display 30 of volts, millivolts, ohms, milliamps or amps. Inputs to the meter are provided through two of three available socket connectors 24, 26 and 28. Connector 24 serves as ground, or common, socket 26 provides the signal input for current readings and socket 28 provides the signal input for voltage and resistance readings. In typical use, an electrical probe would be connected to each of two sockets through a lead and banana connector inserted into the socket. The probes may be held in respective hands and touched to electrical nodes of interest. Alternatively, one of the probes may be attached to the meter housing in a clip 32. With the clip, the user can hold the meter and one probe easily in one hand and hold the other probe in the other hand.

In accordance with the present invention, the two electrical probes typically used with the meter are replaced by a single radiation detector probe 34. The probe 34 has a housing 36 at one end for housing an infrared detector. The probe is held by hand using a handle portion 38, and the tip 39 of the probe housing 36 is directed toward a target of interest. The probe housing 36 is connected to the meter through a cable 40 which carries two leads 42 and 44. Those leads carry banana connectors 46 and 48 to be inserted into the common and voltage sockets 24 and 28.

Figure 2:
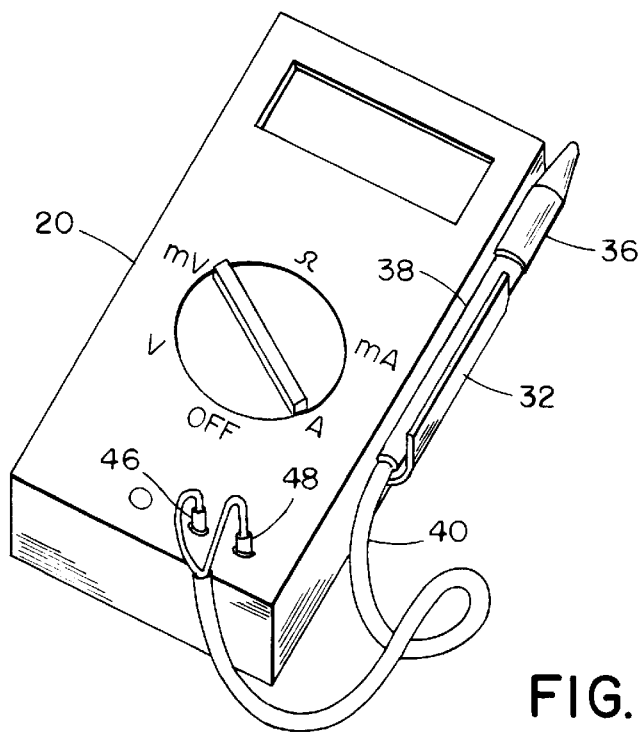
FIG. 2 illustrates the probe and meter of FIG. 1 with the probe electrically coupled to the meter and clipped into the meter housing.

FIG. 2 illustrates the connectors 46 and 48 coupled to the meter. The probe may be held by the handle portion 38 in one hand and directed toward a target, or it may be clipped into the clip 32 as illustrated in FIG. 2. In that case, the entire meter housing would be manipulated to direct the probe toward the target.

An advantage of the present invention is that the principle detection electronics are provided by the multimeter. In the case of detection of faults in electrical equipment, the user would already have possession of such a meter and the ability to provide additional infrared temperature readings requires only a simple probe.

Figure 3:
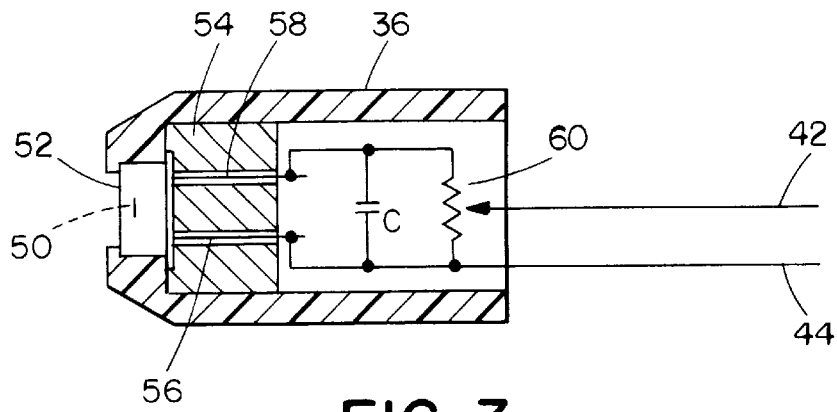
FIG. 3 is a cross-sectional view of the tip of the probe of FIGS. 1 and 2 with an electrical schematic.

The possible simplicity of the probe is illustrated in FIG. 3. The probe housing 36 is shown to be of insulating material so that it is suitable for use near and within electrical equipment. The infrared detector 50 is a conventional thermopile mounted in an electrically conductive can 52 having a window through which the thermopile 50 views a target to the left as viewed in FIG. 3. The thermopile mounted within the can is, for example, available from Dexter Research Center (Michigan).

The can 52 is mounted within the housing 36 by thermal epoxy 54. The can is thermally coupled to the cold junction of the thermopile 50 and is thermally coupled to the epoxy 54. The epoxy 54 therefore serves as a thermal mass at the cold junction temperature which floats with ambient temperature. The pins 56 and 58 from the can provide the electrical output from the thermopile. To minimize response to noise, a capacitor C is provided across the pins. The final output directed through the cable 40 is taken from a scaling potentiometer 60, also coupled across the pins 56 and 58. No amplification is required in the probe since a common multimeter carries its own amplifiers for detecting inputs of as low as 0.1 millivolts. Preferably, the thermopile 50 is selected and the potentiometer is set to provide a voltage output per degree temperature change which matches some decimal output of the meter. For example, a preferred output would be 0.1 millivolts per degree centigrade, so the temperature could be read directly on the millivolt scale by a factor of ten.

The thermopile of FIG. 3 provides an output which, on a first order approximation, is a function of the difference between the target temperature and its cold junction temperature. The cold junction is held to the temperature of the thermal epoxy 54 which is assumed to follow ambient temperature. Thus, the actual reading of the meter is a differential output indicative of the difference between the target temperature and the ambient temperature about the probe housing 36. The thermal mass of the epoxy 54 should be selected to provide a stable output yet a sufficiently rapid response to changes in ambient temperature. In this example, that response is slowed by the use of the insulating housing 36.

Figure 4:
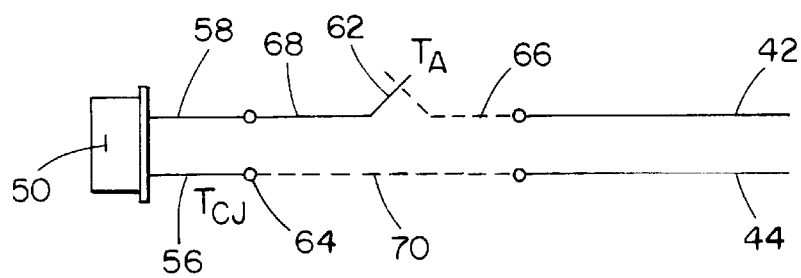
FIG. 4 is an electrical schematic illustrating a thermocouple in series with the thermopile of the probe in accordance with one aspect of the present invention.

FIG. 4 illustrates a modification of the probe for providing a more accurate differential reading between the target and ambient temperatures with more rapid response to changes in ambient temperature. For simplicity, the capacitor and potentiometer of FIG. 3 are not illustrated in FIG. 4 but they may also be coupled within the circuit. As illustrated in FIG. 4, a thermocouple junction 62 is provided in series with the thermopile 50. A second junction of the thermocouple is provided at 64. As illustrated, the thermocouple comprises a thermocouple lead such as iron 66 forming a junction with, for example, constantan 68 at junction 62. The pins 56 and 58 of the thermopile are held at the same temperature so those pins and the thermopile connected within the thermocouple circuit do not affect operation of the thermocouple. The second junction of the thermocouple is effectively the junction from constantan wire 68 to iron lead 70.

The connections of iron leads 66 and 70 to the nonthermocouple copper leads 42 and 44 are at a common temperature, so the leads 42 and 44 and meter electronics do not affect the thermocouple operation. The two nonthermocouple leads 42 and 44 may be connected directly to a conventional voltage meter. This configuration is a modification of the prior approach of U.S. Pat. No. 5,229,612 where the thermocouple leads lead to a thermocouple meter which provides a temperature reference.

Figure 5:
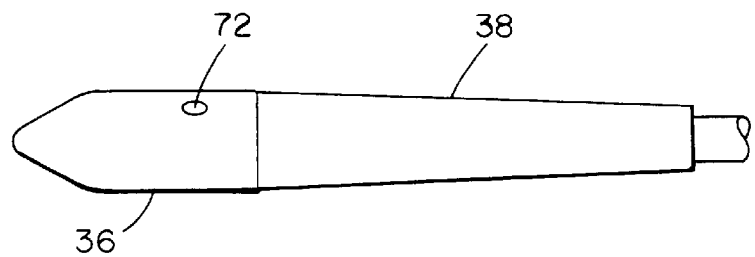
FIG. 5 illustrates the probe housing of FIGS. 1 and 2 having a hole in which the thermocouple of FIG. 4 is positioned.

In one implementation, the junction 62 of the thermocouple is positioned in a hole 72 drilled into the probe housing 36 as illustrated in FIG. 5. Thus, the thermocouple junction 62 responds to ambient temperature. It is preferably of small thermal mass so that it responds rapidly to changes in ambient temperature. The second junction 64 of the thermocouple responds to cold junction temperature. The overall thermocouple responds to the difference in temperature between the cold junction and ambient proportional to a constant $C_{TC}$ which includes the Seebeck coefficient.

Although the output of the thermopile is a fourth order function of target temperature and cold junction temperature it can be approximated to first order as the difference between target temperature and cold junction temperature proportional to a constant $C_{TP}$. Thus, the overall output from the circuit of FIG. 4 can be seen as follows:

$$V = C_{TP}(T_T - T_{CJ}) + C_{TC}(T_{CJ} - T_A) \tag{1}$$

where $C_{TP}$ and $C_{TC}$ are the proportionality constants of the thermopile and thermocouple, respectively, and $T_T$, $T_{CJ}$ and $T_A$ are the temperatures of the target, the cold junction and ambient, respectively. It can be seen that by setting $C_{TP} = C_{TC} = C$, equation 1 reduces to:

$$V = C(T_T - T_A)$$

$C_{TP}$ may be matched to $C_{TC}$ by selection of the thermopile and thermocouple and by design of associated circuitry. For example, the potentiometer 60 of FIG. 3 may be coupled across the thermopile output to attenuate that output to a level which matches the thermocouple. In that respect, reference can be made to applicant's prior U.S. Pat. No. 5,229,612 as well as subsequently filed applications including Continuation-In-Part application Ser. No. 08/041,933, filed Apr. 2, 1993. That patent and application present the combination of the thermopile and a thermocouple with matched coefficients. The second junction of the thermocouple was responsive to a reference temperature of a thermocouple meter rather than to an ambient temperature. However, most of the design considerations presented in that patent and application apply here and are incorporated herein by reference.

Figure 6:
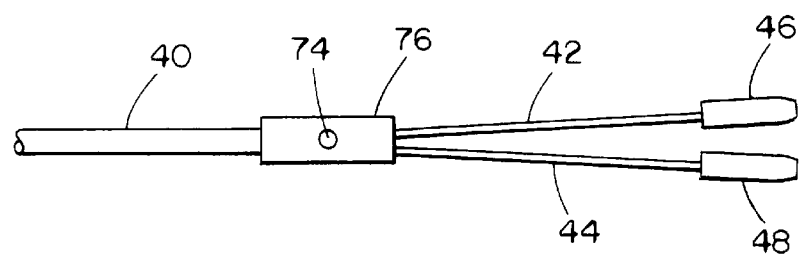
FIG. 6 illustrates a modification of the leads of the probe to position the thermocouple of FIG. 4 near to the meter housing.

The ambient reference temperature, remote from the cold junction but local to the probe housing 36 as illustrated in FIG. 5, is particularly suited to electrical systems monitoring. In such a case, where an electrical resistance is generating heat, the temperature of that resistance will rise sufficiently to dissipate the power being lost. It is therefore critical that the differential reading be relative to the environment immediately surrounding the heat source. In other applications, however, the temperature immediately surrounding the source may be at about the temperature of the source and would thus not provide a meaningful reference. For example, in sensing the temperature of a heated surface such as a drum within a photocopy machine, the surrounding environment within the machine is also heated. The preferred reference is the ambient temperature of the room outside of the machine. To provide such a reference, the thermocouple may be positioned, as illustrated in FIG. 6, close to the meter. As illustrated in FIG. 6, the thermocouple is positioned within a hole 74 in a small housing at the end of the cable 40 closest to the connectors 46 and 48.

Figure 7:
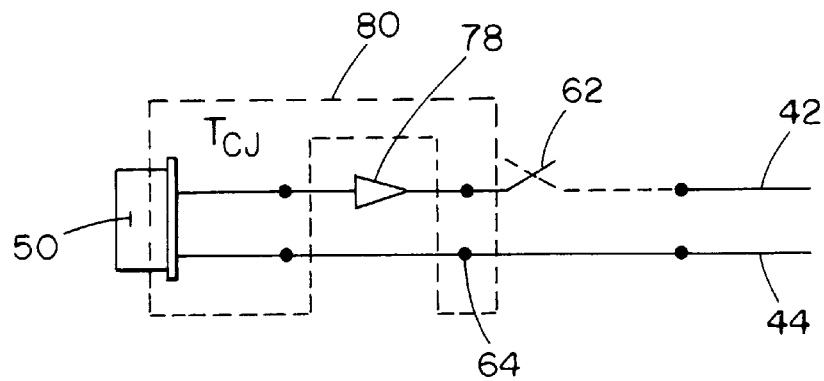
FIG. 7 is an electrical schematic illustrating the addition of an amplifier to match a low output thermopile with the thermocouple.
Figure 8:
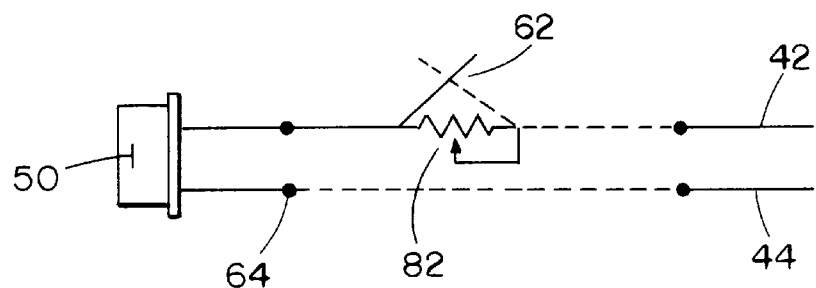
FIG. 8 is an electrical schematic of the thermocouple circuit having a potentiometer coupled to attenuate the thermocouple signal to match it to the thermopile output.

FIG. 7 illustrates another mechanism for matching the coefficients of the thermopile and thermocouple where the thermopile provides a relatively low voltage output. In this case, an amplifier 78 amplifies the output of the thermopile. It is important to assure that the junction 64 of the thermocouple be held at the cold junction temperature through suitable thermal coupling as indicated by the broken lines 80 in FIG. 7.

Alternatively, where the voltage output of the thermocouple is high relative to that of the thermopile, a potentiometer 82 may be coupled across the junction 62.

Figure 9:
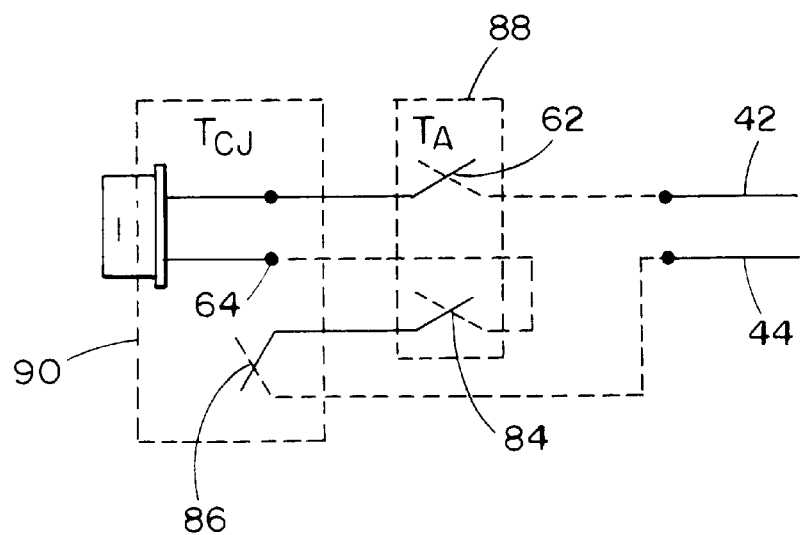
FIG. 9 is an electrical schematic illustrating an additional thermocouple included to match the probe output to a meter scale.

Not only must the thermopile and thermocouple be matched, but for most convenient reading from the meter, without the need for a chart associating voltage output with temperature, the thermopile/thermocouple circuit should be matched to the meter. Since an iron constantan thermocouple has an output of 50 microvolts per degree centigrade, it is convenient to provide two such thermocouples in series for an output of 100 microvolts per degrees C. or 0.1 millivolts per degree C. The latter is a convenient output from the meter which provides a direct reading of temperature difference by a factor of ten. One such series of connection of the two thermocouples is illustrated in FIG. 9. Here an additional thermocouple comprising junctions 84 and 86 is coupled in series with the thermopile and first thermocouple. The second thermocouple can be coupled to either end of the circuit but for this purpose it is critical that the second thermocouple have one junction thermally coupled to the ambient sensing junction 62 of the first thermocouple as illustrated by broken lines 88. It is also critical that the second junction 86 be thermally coupled to the cold junction sensing thermocouple junction 64 as illustrated by broken lines 90.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A temperature detector for providing a differential output indicative of a differential between a target temperature and an ambient temperature comprising:
    an infrared detector for viewing a surface at the target temperature; and
    a thermocouple having one junction positioned to respond to the ambient temperature outside the temperature detector and another junction positioned to respond to a junction temperature of the infrared detector, the infrared detector and thermocouple being coupled electrically to provide a combined differential output.

2. A temperature detector as claimed in claim 1 comprising a probe which includes a probe housing which houses the infrared detector and leads coupled to the probe housing and having connectors at an opposite end for connection to socket connectors of a hand-held electrical meter.

3. A temperature detector as claimed in claim 2 wherein the thermocouple is positioned to respond to the ambient temperature about the probe housing.

4. A temperature detector as claimed in claim 2 wherein the thermocouple senses ambient temperature at about the connectors.

5. A temperature detector as claimed in claim 2 further comprising an electrical meter to which the connectors are connected.

6. A temperature detector as claimed in claim 1 comprising plural thermocouples in series, each thermocouple having a junction responsive to the ambient temperature and a junction responsive to the junction temperature of the infrared detector.

7. A temperature detector as claimed in claim 1 wherein the infrared detector is a thermopile.

8. A temperature detector as claimed in claim 1 wherein the ambient temperature is near to the infrared detector.

9. A method of detecting a differential between a target temperature and an ambient temperature comprising:
    directing an infrared detector in a temperature detector at a surface at the target temperature to provide an output indicative of the target temperature relative to cold junction temperature of the infrared detector;
    positioning a thermocouple junction to respond to the ambient temperature outside the temperature detector and provide an output indicative of temperature difference between the cold junction temperature and the ambient temperature; and
    combining the infrared detector output and the thermocouple output to provide a differential output between the target temperature and the ambient temperature.

10. A method as claimed in claim 9 wherein the ambient temperature is near to the infrared detector.

11. A method of detecting temperature of a target surface comprising:
    providing an infrared detector and a thermocouple in a probe having leads with standard connectors, the thermocouple having one junction positioned to respond to an ambient temperature outside the probe and another junction positioned to respond to a junction temperature of the infrared detector such that the detected temperature is a differential between temperatures of the target surface and the ambient;
    plugging the standard connectors of the leads into a hand-held voltage meter; and
    directing the infrared detector at the target surface to generate a voltage output between the leads and detecting the voltage output with the meter.

12. A method as claimed in claim 11 further comprising positioning the thermocouple junction to respond to ambient temperature near to the infrared detector.

13. A method as claimed in claim 11 further comprising positioning the thermocouple junction to respond to ambient temperature at about the meter.

14. A method as claimed in claim 11 further comprising detecting infrared radiation by means of a thermopile.

* * * * *